(12) United States Patent
Tozawa et al.

(10) Patent No.: US 7,651,639 B2
(45) Date of Patent: Jan. 26, 2010

(54) CONDUCTIVE POLYMER AND SOLID ELECTROLYTIC CAPACITOR USING THE SAME

(75) Inventors: Masaaki Tozawa, Osaka (JP); Ryosuke Sugihara, Osaka (JP)

(73) Assignee: Tayca Corporation, Osaka-shi (JP)

( * ) Notice: Subject to any disclaimer, the term of this patent is extended or adjusted under 35 U.S.C. 154(b) by 0 days.

(21) Appl. No.: 11/984,265

(22) Filed: Nov. 15, 2007

(65) Prior Publication Data

US 2008/0135810 A1 Jun. 12, 2008

Related U.S. Application Data

(62) Division of application No. 10/567,555, filed as application No. PCT/JP2004/011676 on Aug. 6, 2004, now abandoned.

(30) Foreign Application Priority Data

Aug. 11, 2003 (JP) .............................. 2003-291220

(51) Int. Cl.
*C08G 75/00* (2006.01)
*C08G 73/06* (2006.01)
*H01B 1/00* (2006.01)

(52) U.S. Cl. .................. 252/519.14; 528/410; 528/408; 428/402; 252/500; 252/510; 252/519.3

(58) Field of Classification Search ................. 528/377, 528/423
See application file for complete search history.

(56) References Cited

U.S. PATENT DOCUMENTS 4,697,001 A 9/1987 Walker et al.
5,422,423 A * 6/1995 Shacklette et al. .......... 528/422
5,510,532 A 4/1996 Rhee et al.
6,344,966 B1 * 2/2002 Monden et al. ............. 361/524
2004/0010115 A1 * 1/2004 Sotzing ....................... 528/377

FOREIGN PATENT DOCUMENTS

| JP | 10-308116 A | 11/1998 |
|---|---|---|
| JP | 11-54374 A | 2/1999 |
| JP | 2001-6983 A | 1/2001 |
| JP | 2002-134363 A | 5/2002 |
| JP | 2003-22938 A | 1/2003 |
| JP | 2003-40856 A | 2/2003 |
| JP | 2003-158043 A | 5/2003 |
| JP | 2003-160647 A | 6/2003 |
| JP | 2004-189789 A | 7/2004 |

OTHER PUBLICATIONS

International Search Report of International Application No. PCT/JP2004/011676 mailed Nov. 16, 2004.

* cited by examiner

*Primary Examiner*—Harold Y. Pyon
*Assistant Examiner*—Timothy Chiang
(74) *Attorney, Agent, or Firm*—Westerman, Hattori, Daniels & Adrian, LLP

(57) ABSTRACT

The conductive polymer of the present invention is prepared by means of oxidation polymerization. On the matrix of the conductive polymer, at least one organic sulfonate formed by an anion of an organic sulfonic acid and a cation of other than transition metals is coated. Alternatively, in the matrix of the conductive polymer, at least one organic sulfonate formed by an anion of an organic sulfonic acid and a cation of other than transition metals is included. The conductive polymer of the present invention is excellent in the conductivity, heat resistance and moisture resistance. By using it as a solid electrolyte, a reliable solid electrolytic capacitor can be prepared which is unlikely to decrease the properties when being kept in a hot and humid condition.

5 Claims, No Drawings

CONDUCTIVE POLYMER AND SOLID ELECTROLYTIC CAPACITOR USING THE SAME

This application is a divisional of prior application Ser. No. 10/567,555 filed Feb. 8, 2006, now abandoned, which is a National Stage of International Application No. PCT/JP2004/011676 filed on Aug. 6, 2004.

FIELD OF THE INVENTION

The present invention relates to a conductive polymer and a solid electrolytic capacitor using the conductive polymer as a solid electrolyte.

BACKGROUND OF THE INVENTION

Conductive polymers have a high conductivity, which are used as solid electrolytes of a solid electrolytic capacitor such as aluminum capacitors and tantalum capacitors.

As a conductive polymer used therefor, ones are often used which are synthesized by subjecting thiophenes or the derivatives thereof to chemical oxidation polymerization or electrolysis oxidation polymerization.

In carrying out the chemical oxidation polymerization, an organic sulfonic acid is generally used as a dopant, and ammonium persulfate, hydrogen peroxide, and transition metal salts are generally used as an oxidant. Generally, in case where a process of a chemical oxidation polymerization is used to synthesize a conductive polymer, especially by using transition metal salts as an oxidant, it needs to remove unnecessary components by washing.

In such a case, a washing liquid such as an alcohol, water or the combination thereof can be generally used. However, such a washing process causes the dopant to be de-doped, decreasing the electric conductivity of the conductive polymer. In order to avoid the de-doping, it has been proposed to wash it with either or both of an aqueous solution and an ethanol solution, as previously prepared, including an organic sulfonic acid as a dopant.

However, in such a case, it is necessary to further wash it with water or an alcohol in order to avoid an excessive amount of an organic sulfonic acid from remaining. A conductive polymer that an excessive amount of an organic sulfonic acid remains is characterized in being smaller in the initial resistance and less changeable in the electric conductivity when it is kept in a hot condition for an extended period, than ones that an excessive organic sulfonic acid is removed by washing with water or an alcohol at the final stage. However, the conductive polymer in which an excessive amount of an organic sulfonic acid remains is apt to generate $SO_3$ that is toxic when it is kept in hot condition than the conductive polymer which is washed to remove an excessive amount of an organic sulfonic acid, because the excessive (free) organic sulfonic acid is apt to be decomposed in a hot condition. Also, when a capacitor using a conductive polymer including an excessive amount of an organic sulfonic acid is used as a cathode layer, the properties thereof could be instable. (See Japanese Laid-open Patent Publication No. 10-12498)

SUMMARY OF THE INVENTION

In view of the objectives of the prior art, the present invention provides a conductive polymer excellent in conductivity, heat resistance and moisture resistance, which is less changeable in the electric conductivity when being kept in a hot and humid condition, so as to avoid the decomposition in a hot condition. Also, the objective of the present invention is to use the conductive polymer as a solid electrolyte, to provide a reliable solid electrolytic capacitor which less decreases the properties in a hot and humid condition.

The objectives of the present invention can be achieved by providing a conductive polymer including at least one organic sulfonate having an anion of an organic sulfonic acid, that is the same or different from the organic sulfonic acid incorporated in the conductive polymer as a dopant, and a cation other than transition metals.

That is, on the matrix of the conductive polymer prepared by means of the oxidation polymerization of the present invention, at least one Organic sulfonate having an anion of an organic sulfonic acid and a cation other than transition metals is coated. Alternatively, in the matrix of the conductive polymer prepared by means of the oxidation polymerization of the present invention, at least one Organic sulfonate having an anion of an organic sulfonic acid and a cation other than transition metals is included. The present invention also relates to a solid electrolytic capacitor using the conductive polymer as a solid electrolyte.

The conductive polymer of the present invention is excellent in conductivity, heat resistance, and moisture resistance, which less decreases the electric conductivity when being kept in a hot and humid condition and to decompose in a hot condition. Also, the solid electrolyte capacitor of the present invention by using the conductive polymer as a solid electrolyte is reliable because it has the properties less decreased when being kept in a hot and humid condition.

In the present invention, the term "matrix" of the conductive polymer denotes the whole structure of the conductive polymer where its surface is not always smooth. When washing step is applied to the conductive polymer after it is synthesized by means of oxidation polymerization, an oxidant, excessive dopant, unreacted monomer and oligomers incorporated in the conductive polymer can be washed out, and the dopant doped therein can be partly removed, so that the surface is not always made smooth.

The best mode of the present invention is hereinafter described.

First, the organic sulfonate used in the present invention is described. The organic sulfonate is formed by an anion of an organic sulfonic acid and a cation other than a transition metal.

In the organic sulfonate, the examples of the organic sulfonic acid as the anion component can include, as the backbone, at least one selected from the group consisting of benzene ring, naphthalene ring, tetralin ring and anthracene ring. Examples thereof include aromatic sulfonic acids such as benzene sulfonic acid, pentafluorobenzene sulfonic acid, benzene disulfonic acid, para-toluene sulfonic acid, fluoro para-toluene sulfonic acid, ethylbenzene sulfonic acid, dodecylbenzene sulfonic acid, naphthalene sulfonic acid, naphthalene disulfonic acid, methylnaphthalene sulfonic acid, ethylnaphthalene sulfonic acid, butylnaphthalene sulfonic acid, dinonylnaphthalene sulfonic acid, anthraquinone sulfonic acid, anthraquinone disulfonic acid, anthracene sulfonic acid, methoxybenzene sulfonic acid, ethoxybenzene sulfonic acid, butoxybenzene sulfonic acid, methoxynaphthalene sulfonic acid, ethoxynaphthalene sulfonic acid, butoxynaphthalene sulfonic acid, tetralin sulfonic acid, butyltetralin sulfonic acid, sulfobenzene carboxylic acid methylester, sulfobenzene carboxylic acid dimethylester, sulfobenzene carboxylic acid butylester, sulfobenzene dibutylester, sulfonaphthalene carboxylic acid methylester, sulfonaphthalene carboxylic acid dimethylester, sulfonaphthalene carboxylic acid butylester, sulfonaphthalene sulfonic acid dibutylester, phenol sulfonic acid, cresol sulfonic acid, sulfophthalic acid, sulfoisophthalic acid, sulfosalicyclic acid, sulfonaphthoic acid, hydroxysulfonaphthoic acid, naphthol sulfonic acid, benzaldehyde sulfonic acid, benzaldehyde disulfonic acid, and naphtoaldehyde sulfonic acid.

As the organic sulfonic acid, ones having a backbone of at least one selected from the group consisting of benzene ring, naphthalene ring, tetralin ring and anthracene ring; at least one functional group selected from the group consisting of alkyl group having a carbon number of 1 to 12, and hydroxy group, alkoxy carbonyl group having a carbon number of 2 to 10, and alkoxy group and aldehyde group having a carbon number of 1 to 10; and at least one sulfonic acid group can be used. Examples thereof can include methoxybenzene sulfonic acid, ethoxybenzene sulfonic acid, butoxybenzene sulfonic acid, methoxynaphthalene sulfonic acid, ethoxynaphthalene sulfonic acid, butoxynaphthalene sulfonic acid, phenol sulfonic acid, cresol sulfonic acid, sulfophthalic acid, sulfoisophthalic acid, sulfosalicyclic acid, sulfonaphthoic acid, hydroxysulfonaphthoic acid, naphthol sulfonic acid, benzaldehyde sulfonic acid, benzaldehyde disulfonic acid, naphtoaldehyde sulfonic acid, dihydroxy anthracene sulfonic acid, sulfobenzene carboxylic acid methylester, sulfobenzene carboxylic acid dimethylester, sulfobenzene carboxylic acid butylester, sulfobenzene carboxylic acid dibutylester, sulfonaphthalene carboxylic acid methylester, sulfonaphthalene carboxylic acid dimethylester, sulfonaphthalene carboxylic acid butylester, and sulfonaphthalene sulfonic acid dibutylester.

As the cation of the organic sulfonate of the present invention other than transition metals, examples can include a metal other than a transition metal and an organic cation.

As the cation other than the transition metal, sodium ion, potassium ion, magnesium ion, calcium ion, and aluminum ion can be included. Among these metal cations, ones with divalence or more, rather than monovalence, including calcium ion and aluminum ion can be generally used in view of the heat resistance and moisture resistance.

As the organic cations, ones that a basic organic compound such as amino ethanol, diamino propane, imidazolium, amino anthraquinone, amino azotoluene, naphthyl amine and adenine is cationized can be included. Among them, ones that a basic compound is cationized to have a backbone of at least one selected from the group consisting of five-membered heterocyclic ring, benzene ring, naphthalene ring, tetralin ring and anthraquinone ring, and at least one selected from the group consisting of NH group and $NH_2$ group, such as imidazole, amino anthraquinone, amino azotoluene, naphthyl amine, adenine, can be used in view of the heat resistance and moisture resistance.

The organic sulfonate used in the present invention can be formed by a general method for reacting an organic acid with a metal salt or a basic organic compound. That is, the organic sulfonic acid as listed is reacted with a metal salt other than the transition metals, or a basic organic compound, so as to form a usable organic sulfonate. For example, calcium naphtholsulfonate or calcium phenolsulfonate can be obtained from naphtholsulfonic acid or phenolsulfonic acid, which is diluted with pure water, and then, calcium hydroxide is added to be reacted with the naphthol sulfonic acid or the phenol sulfonic acid. Upon the reaction, a filter filtration process can be applied for purification, if necessary.

Next, the conductive polymer obtained by the oxidation polymerization, which is used in the present invention, will be described.

As the monomer for synthesizing the conductive polymer, it is possible to use thiophene, pyrrole and the derivatives thereof.

In synthesizing the conductive polymer by means of the oxidation polymerization, the monomer for synthesizing the conductive polymer, such as pyrrole, thiophene or the derivatives thereof, is polymerized by means of a chemical oxidation polymerization or electrolysis oxidation polymerization method by using an organic sulfonic acid such as paratoluene sulfonic acid as a dopant, so as to obtain a conductive polymer.

Next, to the surface of the obtained conductive polymer, a treatment is applied by using at least one organic sulfonate made of an anion of the organic sulfonic acid and a cation other than transition metals, so as to form a conductive polymer treated with the Organic sulfonate of the present invention. (The conductive polymer can be referred to as "an organic sulfonate treated conductive polymer." Here, the organic sulfonate treatment closely relates to the washing process during synthesizing the conductive polymer, so there are different treatment processes between the chemical oxidation polymerization and the electrolysis oxidation polymerization. Each of the cases is described in detail.

In case of synthesizing the conductive polymer by means of the chemical oxidation polymerization, an organic sulfonic acid such as alkoxybenzene sulfonic acid, alkoxynaphthalene sulfonic acid and alkoxytetralin sulfonic acid is changed into a transition metal salt such as a ferric salt or a cupric salt. The organic sulfonate and a monomer, that is, a raw material of the polymer, are previously and respectively solved into an organic solvent to have a predetermined concentration, and then, the solutions are mixed together, and then, the monomer is polymerized. By washing and drying, a conductive polymer can be obtained. The transition metal of the organic sulfonate can be served as an oxidation polymerization agent for the monomer, and the rest, that is, the organic sulfonic acid component, can be included in the polymer matrix, serving as a dopant. As the organic solvent used for synthesizing the conductive polymer, examples thereof can include methanol, ethanol, n-propanol, and n-butanol. In washing, an organic sulfonic acid such as methoxy benzene sulfonic acid in an organic solution or pure water solution to have a concentration of several % by mass can be used. After the washing, the same organic solvent or pure water can be used for removing the excessive amount of the organic sulfonic acid (here, methoxybenzene sulfonic acid). Thereafter, the conductive polymer is immersed into an organic_sulfonate solution, such as calcium phenolsulfonate aqueous solution or phenol sulfonic acid naphthyl amine salt ethanol solution, having a concentration of several % by mass for several tens of minutes, followed by being taken out and dried.

In case of synthesizing a conductive polymer by means of the electrolysis oxidation polymerization, an organic sulfonic acid such as butylnaphthalene sulfonic acid or the salt thereof (sodium salt, potassium salt, etc.), and a monomer are solved into a solvent, which is then subjected to polymerization under a condition of a constant voltage or constant current, so as to synthesize a conductive polymer. As the solvent used for the synthesis of the conductive polymer, examples thereof can include water, methanol, ethanol, n-propanol, and n-butanol. In washing, an organic sulfonic acid, such as a phenol sulfonic acid solution having a concentration of several % by mass using one of the solvent as listed above, can be used, and after the washing, an excessive amount of the organic sulfonic acid (here, phenol sulfonic acid) can be removed by using pure water or the solvent. Thereafter, the conductive polymer is immersed into an organic sulfonate solution (for example, a calcium phenolsulfonate aqueous solution or a phenol sulfonic acid amino azotoluene salt ethanol solution) having several % by mass for several tens of minutes, followed by being taken out and dried.

The organic sulfonate treated conductive polymer of the present invention, as polymerized and treated by the organic sulfonate, is excellent in conductivity, heat resistance and moisture resistance, is less in decreasing the electric conductivity when being kept in a hot and humid condition, and is less in being decomposed in a hot condition. Thus, it is reliable so that it can be useful in cathode layers of a capacitor, electrodes of a battery, electrical conductive agent for an antistatic sheet and so on. Especially, the solid electrolytic capacitor using the organic sulfonate treated conductive polymer of the present invention as a solid electrolyte is excellent in electric properties.

EXAMPLES

Based on Examples, the present invention is described more in detail. The present invention, however, is not limited to the Examples. Before describing the Examples, Production Examples 1 to 15 are described for explaining the preparation of the Organic sulfonate solution for treating the conductive polymer obtained by the oxidation polymerization method. The symbol "%" used for showing the concentration of the solutions is based on mass % unless other basis is mentioned.

Production Example 1

To 1000 g of 10% paratoluene sulfonic acid aqueous solution stirred at room temperature, 2 mol of hydroxide sodium was added to adjust it into pH6, approximately, so as to obtain a sodium paratoluenesulfonate aqueous solution.

Production Example 2

To 1000 g of 5% paratoluene sulfonic acid aqueous solution stirred at room temperature, 30 g of calcium hydroxide was added. The stirring was continued while measuring the pH value. At the time when the pH value reached 6, approximately, filtration was done by using a 0.4 μm glass filter to remove the insoluble components, so as to obtain a calcium paratoluenesulfonate aqueous solution.

Production Example 3

To 1000 g of 5% phenol sulfonic acid aqueous solution stirred at room temperature, 25 g of magnesium hydroxide was added. The stirring was continued while measuring the pH value. At the time when the pH value reached 6, approximately, filtration was done by using a 0.4 μm glass filter to remove the insoluble components, so as to obtain a magnesium phenolsulfonate aqueous solution.

Production Example 4

To 1000 g of 5% phenol sulfonic acid aqueous solution stirred at room temperature, 30 g of calcium hydroxide was added. The stirring was continued while measuring the pH value. At the time when the pH value reached 6, approximately, filtration was done by using a 0.4 μm glass filter to remove the insoluble components, so as to obtain a calcium phenolsulfonate aqueous solution.

Production Example 5

To 1000 g of 5% pentafluorobenzene sulfonic acid aqueous solution stirred at room temperature, 30 g of calcium hydroxide was added. The stirring was continued while measuring the pH value. At the time when the pH value reached 6, approximately, filtration was done by using a 0.4 μm glass filter to remove the insoluble components, so as to obtain a calcium pentafluorobenzenesulfonate aqueous solution.

Production Example 6

To 1000 g of 5% sulfosalicyclic acid aqueous solution stirred at room temperature, 30 g of calcium hydroxide was added. The stirring was continued while measuring the pH value. At the time when the pH value reached 6, approximately, filtration was done by using a 0.4 μm glass filter to remove the insoluble components, so as to obtain a calcium sulfosalicylate aqueous solution.

Production Example 7

To 1000 ml of 10% aluminum sulfate aqueous solution, 2N sodium hydroxide aqueous solution was added to adjust the pH value into 7.6. The precipitate as generated was collected by means of filtration by using a 4 μm glass filter, followed by stirring it for a period of 10 minutes in order to disperse it into 1000 ml of pure water. Further, the step for collecting the precipitate was repeated for three times by using a 0.4 μm glass filter, followed by dispersing the precipitate into 800 ml of pure water. There, 281 g of phenol sulfonic acid was added, and after 15 hours of stirring at room temperature, insoluble elements were removed by means of filtration by using a 0.4 μm glass filter so as to obtain an aluminum phenolsulfonate aqueous solution.

Production Example 8

To 1000 g of 2% phenol sulfonic acid ethanol solution, 2% amino azotoluene ethanol solution, equimolar to the phenol sulfonic acid component, was added in drops so as to prepare a phenol sulfonic acid amino azotoluene solution.

Production Example 9

To 1000 g of phenol sulfonic acid aqueous solution stirred at room temperature, 10% imidazole aqueous solution was added in drops to adjust the pH value into about 6, approximately, so as to prepare a phenol sulfonic acid imidazole solution.

Production Example 10

To 1000 g of 10% methoxybenzene sulfonic acid aqueous solution stirred at room temperature, 30 g of calcium hydroxide was added. The stirring was continued while measuring the pH value. At the time when the pH value reached 6, approximately, filtration was done by using a 0.4 μm glass filter to remove the insoluble components, so as to obtain a calcium methoxybenzenesulfonate aqueous solution.

Production Example 11

To 1000 g of 5% naphthol sulfonic acid aqueous solution stirred at room temperature, 30 g of calcium hydroxide was added. The stirring was continued while measuring the pH value. At the time when the pH value reached 6, approximately, filtration was done by using a 0.4 μm glass filter to remove the insoluble components, so as to obtain a calcium naphtholsulfonate aqueous solution.

Production Example 12

To 1000 g of 10% catechol sulfonic acid aqueous solution stirred at room temperature, 30 g of calcium hydroxide was added. The stirring was continued while measuring the pH value. At the time when the pH value reached 6, approximately, filtration was done by using a 0.4 μm glass filter to remove the insoluble components, so as to obtain a calcium catecholsulfonate aqueous solution.

Production Example 13

To 1000 g of 10% cresol sulfonic acid aqueous solution stirred at room temperature, 30 g of calcium hydroxide was added. The stirring was continued while measuring the pH value. At the time when the pH value reached 6, approximately, filtration was done by using a 0.4 μm glass filter to remove the insoluble components, so as to obtain a calcium cresolsulfonate aqueous solution.

Production Example 14

To 1000 g of 10% sulfophthalic acid aqueous solution stirred at room temperature, 30 g of calcium hydroxide was added. The stirring was continued while measuring the pH value. At the time when the pH value reached 6, approximately, filtration was done by using a 0.4 μm glass filter to remove the insoluble components, so as to obtain a calcium sulfophthalate aqueous solution.

Production Example 15

To 1000 g of 10% dodecylphenol sulfonic acid solution (ethanol 50% aqueous solution) stirred at room temperature, 30 g of calcium hydroxide was added. The stirring was continued while measuring the pH value. At the time when the pH value reached 6, approximately, filtration was done by using a 0.4 μm glass filter to remove the insoluble components, so as to obtain a calcium dodecylphenolsulfonate aqueous solution.

Next, by means of chemical oxidation polymerization, polyethylene dioxythiophene was prepared. Thereby obtained polyethylene dioxythiophene was applied to the treatment by the Organic sulfonate solution as prepared in accordance with Production Examples 1 to 11, so as to prepare Examples 1 to 11. With respect to the polyethylene dioxythiophene prepared in the same manner as the chemical oxidation polymerization as explained above, Comparative Example 1 was prepared without applying the treatment by the organic sulfonate solution. Also, with respect to the polyethylene dioxythiophene prepared in the same manner as the chemical oxidation polymerization as explained above, Comparative Examples 2 to 5 were prepared by replacing the treatment by the organic sulfonates of Examples 1 to 11 with the treatment by the organic sulfonic acid solutions.

Examples 1 to 11

First, as explained below, polyethylene dioxythiophene was prepared by means of chemical oxidation polymerization.

Ferric paratoluenesulfonate was solved into n-butanol to have a concentration of 0.5 mol/l. Sufficient sets of the same solution were prepared for Examples 1 to 11. To each of the solutions, 3,4-ethylene dioxythiophene was added and fully stirred to have a concentration of 0.5 mol/l, and using the ferric sulfonate as an oxidant, the oxidation polymerization of 3,4-ethylene dioxythiophene was initiated, and immediately thereafter, they were separately dropped on a ceramic plate having a size of 3 cm×5 cm at an amount of 180 μl.

They were polymerized under the condition at a temperature of 25° C. and at a relative humidity (hereinafter, it is referred to as "humidity" for simplification) of 60% for a period of 12 hours, so as to form a film of polyethylene dioxythiophene formed on the ceramic plate. The polyethylene dioxythiophene formed on the ceramic plate was washed by immersing it into 2% paratoluene sulfonic acid aqueous solution for a period of 60 minutes, followed by immersing it into ethanol for a period of 30 minutes, so as to remove the excessive amount of paratoluene sulfonic acid. Thereafter, the sulfonic acid solution as prepared by Production Examples 1 to 11 was adjusted in concentration into 2% organic sulfonate solution. To each of the organic sulfonates solution, the ceramic plate forming the polyethylene dioxythiophene was immersed, and after 5 minutes, it was taken out and dried at a temperature of 50° C. for a period of 30 minutes, followed by drying it at a temperature of 150° C. for a period of 40 minutes, so as to complete the organic sulfonate treatment of the polyethylene dioxythiophene to obtain the samples of Examples 1 to 11.

Comparative Example 1

Unlike Example 1, the polyethylene dioxythiophene obtained by means of chemical oxidation polymerization in the same manner as Example 1 was not subjected to the organic sulfonate treatment of Example 1, or used as it is, so as to obtain Comparative Example 1.

Comparative Examples 2 to 5

The polyethylene dioxythiophene by means of chemical oxidation polymerization as prepared in the same manner as Example 1 was treated by 2% paratoluene sulfonic acid aqueous solution so as to prepare Comparative Example 2; was treated by 2% paratoluene sulfonic acid aqueous solution ethanol solution so as to prepare Comparative Example 3; was treated by 2% phenol sulfonic acid aqueous solution so as to prepare Comparative Example 4; and was treated by 2% phenol sulfonic acid ethanol solution so as to prepare Comparative Example 5. That is, these Comparative Examples 2 to 5 were prepared by replacing the organic sulfonate solution treatment of Examples 1 to 11 with the organic sulfonic acid solution treatment. Except for such replacement of the treatment, the method for the treatment is the same as Examples 1 to 11.

Test Example 1

Examples 1 to 11 in which t polyethylene dioxythiophene formed on the ceramic plate are subjected to the organic sulfonate treatment, Comparative Example 1 in which the organic sulfonate treatment was not applied, and Comparative Examples 2 to 5 in which the organic sulfonic acid treatment was applied, were used. The polyethylene dioxythiophene formed on the ceramic plate was subjected to a load of 1.5 tons (t), which condition was kept for a period of 5 minutes to equalize the film thickness. Then, the electric conductivity of the polyethylene dioxythiophene was measured at room temperature (about 25° C.) in accordance with JIS K 7194 by means of four probes type electric conductivity measuring device (MCP-T600 manufactured by Mitsubishi Chemical Corporation). The results and the components used for the treatment are summarized in Table 1.

Test Example 2

Storage Test in a Hot Condition

The polyethylene dioxythiophenes formed on the ceramic plates of Examples 1 to 11 and Comparative Examples 1 to 5, whose electric conductivity were measured in Test Example 1, were placed into a temperature controlled bath kept at a temperature of 130° C. After 120 hours of storage, the plates were taken out, and the electric conductivity of the polyethylene dioxythiophene was measured in the same manner as Test Example 1, to research the decrease rate of the electric conductivity during storage at a hot condition. The results are summarized in Table 2. The decrease rate of the electric conductivity was shown by percentage (%) calculated by subtracting the initial electric conductivity (electric conductivity before the storage at a hot condition that is, the electric conductivity measured by Test Example 1) from the electric conductivity after the storage, which is then divided by the initial electric conductivity. The formula for calculating the decrease rate of the electric conductivity was shown below.

[Decrease Rate of Electric Conductivity (%)]=[(Initial Electric Conductivity)−(Electric Conductivity after Storage)]/(Initial Electric Conductivity)×100

Test Example 3

Storage Test in a Hot and Humid Condition

Except for keeping it in a temperature controlled bath maintained at a temperature of 85° C. and at a humidity of 85% for a period of 300 hours, the same procedure was applied as Test Example 2, in order to measure the decrease rate of the electric conductivity. The results are summarized in Table 3.

TABLE 1

| | Name of the components of the treatment liquid | Electric Conductivity (S/cm) |
|---|---|---|
| Example 1 | Sodium paratoluenesulfonate | 94 |
| Example 2 | Calcium paratoluenesulfonate | 98 |
| Example 3 | Magnesium phenolsulfonate | 105 |
| Example 4 | Calcium phenolsulfonate | 102 |
| Example 5 | Calcium pentafluorobenzenesulfonate | 116 |
| Example 6 | Calcium sulfosalicylate | 99 |
| Example 7 | Aluminum phenolsulfonate | 138 |
| Example 8 | Phenol sulfonic acid amino azotoluene | 118 |
| Example 9 | Phenol sulfonic acid imidazole | 115 |
| Example 10 | Calcium methoxybenzenesulfonate | 108 |
| Example 11 | Calcium naphtholsulfonate | 98 |
| Comparative Example 1 | No treatment | 80 |
| Comparative Example 2 | Paratoluene sulfonic acid | 150 |
| Comparative Example 3 | Paratoluene sulfonic acid | 145 |
| Comparative Example 4 | Phenol sulfonic acid | 140 |
| Comparative Example 5 | Phenol sulfonic acid | 140 |

TABLE 2

| | Decrease Rate of the Electric Conductivity (%) (Storage at 130° C. for 120 hours) |
|---|---|
| Example 1 | 40 |
| Example 2 | 36 |
| Example 3 | 27 |
| Example 4 | 17 |
| Example 5 | 27 |
| Example 6 | 25 |
| Example 7 | 18 |
| Example 8 | 23 |
| Example 9 | 22 |
| Example 10 | 31 |
| Example 11 | 28 |
| Comparative Example 1 | 90 |
| Comparative Example 2 | 54 |
| Comparative Example 3 | 54 |
| Comparative Example 4 | 49 |
| Comparative Example 5 | 48 |

TABLE 3

| | Decrease Rate of the Electric Conductivity (%) (Storage at 85° C. at a humidity of 85% for 300 hours) |
|---|---|
| Example 1 | 44 |
| Example 2 | 40 |
| Example 3 | 29 |
| Example 4 | 25 |
| Example 5 | 35 |
| Example 6 | 33 |
| Example 7 | 22 |
| Example 8 | 28 |
| Example 9 | 30 |
| Example 10 | 28 |
| Example 11 | 30 |
| Comparative Example 1 | 62 |
| Comparative Example 2 | 48 |
| Comparative Example 3 | 49 |
| Comparative Example 4 | 49 |
| Comparative Example 5 | 50 |

As shown in Table 1, the organic sulfonate treated polyethylene dioxythiophenes of Examples 1 to 11, that is, the polyethylene dioxythiophene obtained by means of oxidation polymerization which is then washed and treated by an Organic sulfonate solution (In case of this organic sulfonate treated polyethylene dioxythiophene, the organic sulfonate is coated on the matrix of the polyethylene dioxythiophene obtained by the oxidation polymerization, or the organic sulfonate is included in the matrix of the polyethylene dioxythiophene obtained by the oxidation polymerization, but for simplification, the polyethylene dioxythiophene in such a state is referred to as the "polyethylene dioxythiophene in accordance with Example."), showed a higher electric conductivity than the polyethylene dioxythiophene in accordance with Comparative Example 1 which was not treated by the organic sulfonate solution. It should be noted that in Test Example 1, the organic sulfonate treated polyethylene dioxythiophenes of Examples 1 to 11 showed a lower electric conductivity than the polyethylene dioxythiophene of Comparative Examples 2 to 5, that is, the polyethylene dioxythiophene obtained by the oxidation polymerization followed by being washed and treated by the organic sulfonic acid solution. However, the decrease rate of the electric conductivity of the polyethylene dioxythiophenes of Comparative Examples 2 to 5 were more than the polyethylene dioxythiophenes of Examples 1 to 11, when they were kept in a hot condition or in a hot and humid condition as shown in Test Examples 2 to 3. That is, as shown in Tables 2 and 3, the polyethylene dioxythiophenes of Examples 1 to 11 less decreased the electric conductivity when they were kept in a hot condition or in a hot and humid condition, and found to be excellent in heat resistance and moisture resistance, compared with the polyethylene dioxythiophenes of Comparative Example 1 as well as the polyethylene dioxythiophenes of Comparative Examples 2 to 5. The polyethylene dioxythiophenes of Comparative Examples 2 to 5, which were treated by the organic sulfonic acid solution, showed a higher electric conductivity than the polyethylene dioxythiophenes of Examples 1 to 11 as shown in Test Example 1, but more decreased the electric conductivity when they were kept in a hot condition or in a hot and humid condition, so they were inferior to the polyethylene dioxythiophenes of Examples 1 to 11 in view of the heat resistance and the moisture resistance.

Examples 12 to 19

The same procedure were applied as Example 1 to synthesize the conductive polymer (at a temperature of 25° C. and a humidity of 60% for a period of 12 hours to carry out the oxidation polymerization). Then, instead of washing it with 2% paratoluene sulfonic acid aqueous solution, the ceramic plate forming the polyethylene dioxythiophene was immersed into ethanol for a period of 5 minutes, followed by taking it out and drying it at a temperature of 50° C. for a period of 1 hour. The organic sulfonate solutions as prepared in accordance with Production Examples 4, 6, 9 and 12-15, and sodium benzaldehydesulfonate (manufactured by Wako Pure Chemical Industries Ltd.) were made their concentration adjusted into 2%, and 100 μl of each of the solutions was separately dropped on the polyethylene dioxythiophene formed on the ceramic plate, followed by drying it at room temperature for a period of 1 hour and further drying it at a temperature of 200° C. for a period of 10 minutes. In adjusting the concentration of the Organic sulfonate solution, the concentration of Production Example 15 was adjusted by using 50% ethanol aqueous solution, and the others were adjusted by water.

Examples 20 to 24

The same procedures were applied as Example 1 to synthesize the conductive polymer (at a temperature of 25° C. and a humidity of 60% for a period of 12 hours to carry out the oxidation polymerization). Then, instead of washing it with 2% paratoluene sulfonic acid aqueous solution, the ceramic plate forming the polyethylene dioxythiophene was immersed into ethanol for a period of 5 minutes, followed by drying it at a temperature of 50° C. for a period of 1 hour. Then, the organic sulfonate solution of Production Examples 4, 6 and 14, and the sodium benzaldehydesulfonate solution, whose concentration was adjusted into 2% in accordance with Examples 12 to 19, were mixed to have the ratio (mass ration) of the components as shown in Table 4, and 100 μl of the mixed solutions were separately dropped on the polyethylene dioxythiophene formed on the ceramic plate, followed by drying them at room temperature for a period of 1 hour and further drying them at a temperature of 200° C. for a period of 10 minutes.

The mixed solution of the organic sulfonate used in Example 20 includes calcium phenolsulfonate and sodium benzaldehydesulfonate at a mass ratio of 1:1 as components. The mixed solution of the organic sulfonate used in Example 21 includes calcium phenolsulfonate and calcium sulfosalicylate at a mass ratio of 1:1 as components. The mixed solution of the organic sulfonate used in Example 22 includes calcium phenolsulfonate and calcium sulfophthalic at a mass ratio of 1:1 as components. The mixed solution of the organic sulfonate used in Example 23 includes calcium phenolsulfonate, calcium sulfosalicylate and calcium sulfophthalic at a mass ratio of 1:1:1 as components. The mixed solution of the organic sulfonate used in Example 24 includes calcium phenolsulfonate, calcium sulfophthalate and sodium benzaldehydesulfonate at a mass ratio of 1:1:1 as components.

Comparative Example 6

The same procedures as Example 12 were applied except for skipping the treatment by the organic sulfonate solution. The polyethylene dioxythiophene formed on a ceramic plate was immersed in ethanol, which was then taken out for drying it so as to prepare the polyethylene dioxythiophene of Comparative Example 6.

Comparative Example 7

The same procedures as Example 12 were applied except for replacing the treatment by the organic sulfonate solution of Example 12 with the treatment by 2% phenol sulfonic acid aqueous solution, so as to prepare polyethylene dioxythiophene of Comparative Example 7.

Test Example 4

To each of the polyethylene dioxythiophenes as prepared in Examples 12 to 24 and Comparative Examples 6 and 7, a load of 5 tons was applied and kept for a period of 5 minutes for equalizing the film thickness. Then, the electric conductivity was measured by using four probes type electric conductivity measuring device (MCP-T600 manufactured by Mitsubishi Chemical Corporation), in the same manner as Test Example 1. The results and the components used for the treatment are summarized in Table 4.

Test Example 5

With respect to the polyethylene dioxythiophenes of Examples 12 to 24 and Comparative Examples 6 and 7, a storage test in a hot condition at a temperature of 130° C. for a period of 120 hours in the same manner as Test Example 2 was conducted to research the decrease rate of the electric conductivity when being kept in a hot condition. The results are summarized in Table 5.

Test Example 6

With respect to the polyethylene dioxythiophenes of Examples 12 to 24 and Comparative Examples 6 and 7, a storage test in a hot and humid condition at a temperature of 85° C. at a humidity of 85% in the same manner as Test Example 3 was conducted to research the decrease rate of the electric conductivity when being kept in a hot and humid condition. The results are summarized in Table 6.

TABLE 4

| | Component in the Treatment Liquid | Electric Conductivity(S/cm) |
|---|---|---|
| Example 12 | Calcium phenolsulfonate | 110 |
| Example 13 | Phenol sulfonic acid imidazole | 119 |
| Example 14 | Calcium sulfosalicylate | 109 |
| Example 15 | Calcium catecholsulfonate | 119 |
| Example 16 | Calcium cresolsulfonate | 115 |
| Example 17 | Calcium sulfophthalate | 119 |
| Example 18 | Dodecyl calcium phenolsulfonate | 115 |
| Example 19 | Sodium benzaldehydesulfonate | 120 |
| Example 20 | Calcium phenolsulfonate:sodium benzaldehydesulfonate = 1:1 | 124 |
| Example 21 | Calcium phenolsulfonate:calcium sulfosalicylate = 1:1 | 110 |
| Example 22 | Calcium phenolsulfonate:calcium sulfophthalate = 1:1 | 126 |
| Example 23 | Calcium phenolsulfonate:calcium sulfosalicylate:calcium sulfophthalate = 1:1:1 | 119 |
| Example 24 | Calcium phenolsulfonate:calcium sulfophthalate:sodium benzaldehydesulfonate = 1:1:1 | 128 |
| Comparative Example 6 | No Treatment | 91 |
| Comparative Example 7 | Phenol sulfonic acid | 140 |

TABLE 5

| | Decrease Rate of Electric Conductivity (%) (After storage at 130° C. for 120 hours) |
|---|---|
| Example 12 | 32 |
| Example 13 | 35 |
| Example 14 | 39 |
| Example 15 | 29 |
| Example 16 | 30 |
| Example 17 | 42 |
| Example 18 | 35 |
| Example 19 | 40 |
| Example 20 | 18 |
| Example 21 | 18 |
| Example 22 | 18 |
| Example 23 | 15 |
| Example 24 | 11 |
| Comparative Example 6 | 99.1 |
| Comparative Example 7 | 64 |

TABLE 6

| | Decrease Rate of Electric Conductivity (%) (After Storage at 85° C. at a humidity of 85% for 300 hours) |
|---|---|
| Example 12 | 41 |
| Example 13 | 39 |
| Example 14 | 43 |
| Example 15 | 37 |
| Example 16 | 36 |
| Example 17 | 41 |
| Example 18 | 40 |
| Example 19 | 41 |
| Example 20 | 22 |
| Example 21 | 21 |
| Example 22 | 22 |
| Example 23 | 16 |
| Example 24 | 13 |
| Comparative Example 6 | 92 |
| Comparative Example 7 | 62 |

As shown in Table 4, even in a state where the washing was not fully done so that the matrix of the conductive polymer was considered to include considerable amounts of iron components, the polyethylene dioxythiophenes of Examples 12 to 24, which were treated by the organic sulfonate solution, showed a higher electric conductivity than the conductive polymer of Comparative Example 6 which was not treated by the organic sulfonate solution. Also, as shown in Tables 5 and 6, the polyethylene dioxythiophenes of Examples 12 to 24 less decreased the electric conductivity when being kept in a hot condition or in a hot and humid condition, and found to be excellent in the heat resistance and the moisture resistance, compared with the polyethylene dioxythiophene of Comparative Example 6 as well as the polyethylene dioxythiophene of Comparative Example 7 that was treated by the organic sulfonic acid solution.

Test Example 7

With respect to the polyethylene dioxythiophenes in accordance with Example 4, Example 10, Example 15, Example 20, Example 24, Comparative Examples 1 to 2, and Comparative Example 4, a TG-DTA measurement by using SSC5200 manufactured by Seiko Instruments Inc. was conducted while raising a temperature at a rate of 5° C./min, from an initial temperature of 30° C., and in a nitrogen atmosphere, in order to calculate the decrease rate of the mass in raising the temperature from 100° C. to 240° C. by using the following formula. The results and the components for the treatment are summarized in Table 7.

Mass Decrease Rate(%)=(Mass decrease rate at 240° C.)−(Mass decrease rate at 100° C.)

TABLE 7

| | Component in the Treatment Liquid | Mass Decrease Rate(%) |
|---|---|---|
| Example 4 | Calcium phenolsulfonate | 0.6 |
| Example 10 | Calcium methoxybenzenesulfonate | 0.6 |
| Example 15 | Calcium catecholsulfonate | 0.6 |
| Example 20 | Calcium phenolsulfonate:sodium benzaldehydesulfonate = 1:1 | 0.5 |
| Example 24 | Calcium phenolsulfonate:calcium sulfophthalate:sodium benzaldehydesulfonate = 1:1:1 | 0.5 |
| Comparative Example 1 | No Treatment | 0.7 |
| Comparative Example 2 | Paratoluene sulfonic acid | 4.1 |
| Comparative Example 4 | Phenol sulfonic acid | 4.4 |

As shown in Table 7, the polyethylene dioxythiophenes treated by the Organic sulfonate in accordance with Example 4, Example 10, Example 15, Example 20 and Example 24 showed a less decrease rate (%) of the mass compared with the polyethylene dioxythiophenes treated by the organic sulfonic acid in accordance with Comparative Example 2 and Comparative Example 4.

The reasons of the improvement are considered as follows: In case of Comparative Example 2 or Comparative Example 4 treated by the organic sulfonic acid where a salt is not formed, the organic sulfonic acid could be decomposed. On the other hand, in case of Example 4, Example 10, Example 15, Example 20 and Example 24 treated by the organic sulfonate, the organic sulfonate could be less decomposed compared with the organic sulfonic acid, resulting in becoming excellent in the heat resistance.

Test Example 8

The polyethylene dioxythiophene of Example 4 (that is, the polyethylene dioxythiophene treated by the calcium phenolsulfonate aqueous solution as prepared in Production Example 4) and the polyethylene dioxythiophene of Comparative Example 1 (that is, the polyethylene dioxythiophene not treated by the Organic sulfonate solution) were partly peeled off from the ceramic plate by using a spatula, about 20 mg of which was then separately put into a 20 ml vial container with a stopple. Then, 1 ml of 70% nitric acid was added to each of the containers, and closed the stopple for keeping it at a temperature of 50° C. for a period of 48 hours so as to completely decompose the polyethylene dioxythiophene. Then, 19 ml of pure water was added, for filtrating it through a 0.2 μm filter, which was then subjected to measurement of the calcium amount by using an ICP optical emission spectrometry device, SPS1200A, manufactured by Seiko Instrument Industries Inc. The results are summarized in Table 8.

TABLE 8

|  | Calcium amount |
| --- | --- |
| Example 4 | 38 ppm |
| Comparative Example 1 | 0.1 ppm |

As clearly shown in Table 8, the polyethylene dioxythiophene of Example 4 well maintained the amount of calcium.

Also, the polyethylene dioxythiophene of Example 4 was analyzed by using an EDX [energy dispersive X-ray analyzer, EMAX-1770 manufactured by Horiba Ltd.]. The analysis found that the polyethylene dioxythiophene included calcium dispersed homogenously. From the results here as well as the results shown in Test Example 7, the polyethylene dioxythiophene of Example 4 included an organic sulfonate homogenously dispersed in or on the matrix.

Generally, in case where a washing process is not applied or iron components remain even after the washing process, it has been known that the heat resistance and the moisture resistance of the conductive polymer are inferior to the case where the iron components are completely removed. This phenomena is considered due to de-doping by reduction or polymer decomposition by changing a divalent iron into a trivalent iron. The reason why the treatment by the organic sulfonate aqueous solution of Examples improved the heat resistance and moisture resistance compared with the ones not treated by the organic sulfonate is because the organic sulfonate restricts the change of the iron valence so as to restrict the conductive polymer from being de-doped by reduction or decomposition.

Examples 25 and 26

In Examples 25 and 26, the conductive polymer prepared by electrolysis oxidation polymerization was treated by the Organic sulfonate solution.

First, a ceramic plate coated with the conductive polymer, which was used as the anode during the electrolysis oxidation polymerization, was prepared. That is, as an oxidant, ferric paratoluenesulfonate solution was used. By conducting the same procedure as Example 1, a ceramic plate forming a polyethylene dioxythiophene was obtained. The obtained ceramic plate was used as an anode, and a stainless steel (SUS304) was used as a cathode, and the electrolysis oxidation polymerization was carried out by the following procedure.

To a solution obtained by solving butyl naphthalene sulfonic acid sodium into pure water to have a concentration of 0.04 mol/l, pyrrole was added to have a concentration of 0.04 mol/l. Using the anode and cathode as explained above, a constant current of 1 mA/cm was applied for a period of 70 minutes so as to synthesize a polypyrrole incorporating butyl naphthalene sulfonic acid sodium as a dopant. Then, it was fully washed with 2% butyl naphthalene sulfonic acid ethanol solution, and an excessive amount of butyl naphthalene sulfonic acid was removed by ethanol. Thereby obtained polypyrrole, together with the ceramic plate, was immersed into 2% organic sulfonate solution whose concentration was adjusted in Production Example 4 and Production Example 8, for a period of 10 minutes. Then, the plate was taken out, dried at a temperature of 50° C. for a period of 1 hour, and further dried at a temperature of 150° C. for a period of 1 hour, so as to prepare a polypyrrole/polyethylene dioxythiophene complex of Example 25 and polypyrrole/polyethylene dioxythiophene complex of Example 26.

Comparative Example 8

To the polypyrrole/polyethylene dioxythiophene complex obtained by the electrolysis oxidation polymerization, the same procedure as Example 25 was conducted except for skipping the treatment by the organic sulfonate of Example 25, so as to prepare a polypyrrole/polyethylene dioxythiophene complex of Comparative Example 8.

Test Example 9

To the polypyrrole/polyethylene dioxythiophene complex as prepared in accordance with Example 25, 26 and Comparative Example 8, a load of 1.5 tons was applied for a period of 5 hours to equalize the film thickness. Then, at room temperature (about 25° C.), a surface resistance was measured by using a four probes type electric conductivity measuring device [MCP-T600 manufactured by Mitsubishi Chemical Corporation] in accordance with JIS K 7194. The results and the components are summarized in Table 9.

TABLE 9

|  | Components in the Treatment Liquid | Surface resistance(Ω) |
| --- | --- | --- |
| Example 25 | Calcium phenolsulfonate | 6.8 |
| Example 26 | Phenol sulfonic acid amino azotoluene | 6.6 |
| Comparative Example 8 | No Treatment | 8.9 |

As shown in Table 9, the polypyrrole/polyethylene dioxythiophene complexes in accordance with Examples 25 and 26, which were treated by the organic sulfonate solution, showed a less surface resistance and a higher electric conductivity than the polypyrrole/polyethylene dioxythiophene complex in accordance with Comparative Example 8, which was not treated by the organic sulfonate solution.

Test Example 10

With respect to the polypyrrole/polyethylene dioxythiophene complexes in accordance with Examples, 25, 26 and Comparative Example 8, the same procedure as Test Example 2 was conducted except for changing the storage period into 48 hours and except for replacing the electric conductivity measurement with a surface resistance measurement, so as to research the increase rate of the surface resistance when being kept in a hot condition. The results are summarized in table 10. The increase rate of the surface resistance is calculated by the following formula.

[Increase Rate of the Surface Resistance (%)]=[(Surface Resistance after Storage)/(Initial Surface Resistance)]×100

In the formula above, the "initial surface resistance" means the surface resistance measured before the storage (that is, the surface resistance measured in accordance with Test Example 9).

TABLE 10

| | Increase Rate of Surface Resistance(%) (After storage at 130° C. for 48 hours) |
|---|---|
| Example 25 | 480 |
| Example 26 | 420 |
| Comparative Example 8 | 1200 |

As shown in Table 10, the polypyrrole/polyethylene dioxythiophene complexes in accordance with Examples 25 and 26, which were treated by the organic sulfonate solution, less increased the surface resistance when being kept at a hot condition and were found to be excellent in the heat resistance, compared with the polypyrrole/polyethylene dioxythiophene complex of Comparative Example 8, which was not treated by the organic sulfonate solution.

Examples 27 to 29

Using the polyethylene dioxythiophene of Example 4, the polyethylene dioxythiophene of Example 6 and the polyethylene dioxythiophene of Example 7, the solid electrolytic capacitors were prepared.

First, a tantalum sintered compact was immersed into a phosphoric acid aqueous solution, followed by applying an voltage to carry out electrolytic oxidation. As a result, a dielectric oxidation film was formed on the surface of the tantalum sintered compact. Then, in order to carry out chemical oxidation polymerization, a solution including an oxidant and iron (III) paratoluenesulfonate as a dopant was prepared. The tantalum sintered compact whose surface had formed the dielectric oxidation film was immersed into a solution including iron (III) paratoluenesulfonate for a period of 20 minutes, followed by taking it out to dry it at a temperature of 40° C. for a period of 30 minutes. Then, it was immersed into a monomer of ethylene dioxythiophene for a period of 15 minutes, followed by taking it out to carry out chemical oxidation polymerization in an atmosphere of a temperature of about 25° C. at a humidity of 40%. Then, it was immersed into 2% paratoluene sulfonic acid aqueous solution for a period of 60 minutes, and then, immersed into pure water for a period of 30 minutes for washing, followed by drying it at a temperature of 80° C. for a period of 30 minutes. Further, the steps of immersing it into the solution including iron (III) paratoluenesulfonate for a period of 20 minutes followed by washing and drying were repeated for ten times, so as to synthesize polyethylene dioxythiophene. Then, after it was immersed into a phosphoric acid aqueous solution, a voltage was applied to repeating the synthesis. Thereafter, each of the samples was immersed into the organic sulfonate aqueous solution obtained by adjusting the concentration of the Organic sulfonate solution into 2% in accordance with Production Example 4, Production Example 6 and Production Example 7, for a period of 20 minutes, followed by drying it at a temperature of 100° C. for a period of 30 minutes. Then, a carbon paste and a silver paste were applied, and an anode lead and a cathode lead were provided to be taken from the anode layer and the cathode layer, respectively. Then, an outer shell was formed by an epoxy resin around the area. Finally, an aging treatment was applied so as to obtain a solid electrolytic capacitor.

Comparative Example 9

The same procedure as Example 27 was applied except for skipping the treatment of the polyethylene dioxythiophene into an organic sulfonate solution, so as to prepare a solid electrolytic capacitor.

Comparative Example 10

The same procedure as Example 27 was applied to the polyethylene dioxythiophene, except for replacing the treatment by the organic sulfonate solution in Example 27 with the treatment by 2% phenol sulfonic aqueous solution, so as to prepare a solid electrolytic capacitor.

Test Example 11

The solid electrolytic capacitors in accordance with Examples 27 to 29 and Comparative Examples 9 and 10 were kept at a temperature of 85° C. at a humidity of 85% for a period of 1000 hours, to measure the capacitance. The capacitance was also measured before the storage, which was referred to as an initial property. Compared with the initial property, the capacitance ratio after the storage is shown in table 11. Also, with respect to the solid electrolytic capacitors in accordance with Examples 27 to 29 and Comparative Examples 9 and 10, the equivalent series resistance (ESR) was measured. The results and the components are summarized in Table 11.

TABLE 11

| | Components in the Treatment Liquid | Capacitance (%) | Equivalent Series Resistance (%) |
|---|---|---|---|
| Example 27 | Calcium phenolsulfonate | 95 | 118 |
| Example 28 | Calcium sulfosalicylate | 93 | 116 |
| Example 29 | Aluminum phenolsulfonate | 94 | 114 |
| Comparative Example 9 | No Treatment | 85 | 160 |
| Comparative Example 10 | Phenol sulfonic acid | 75 | 139 |

As shown in Table 11, the solid electrolytic capacitors of Examples 27 to 29, using the polyethylene dioxythiophene treated by the organic sulfonate solution, less decreased the capacitance and to change the equivalent series resistance when being kept in a hot and humid condition, resulting in being excellent in the heat resistance and the moisture resistance, compared with the solid electrolytic capacitor of Comparative Example 9 which was not treated by the organic sulfonate solution and the solid electrolytic capacitor of Comparative Example 10 which was treated by the organic sulfonic acid solution.

INDUSTRIAL UTILITY

As explained above, the conductive polymer of the present invention is excellent in the conductivity, heat resistance and moisture resistance, and less decreased the electric conductivity when being kept in a hot and humid condition, and to decompose in a hot condition. Therefore, the solid electrolytic capacitor using the conductive polymer as a solid electrolyte of the present invention less decreased the properties in a hot and humid condition, resulting in being reliable.

What is claimed is:

1. A method for preparing a conductive polymer, comprising:
    Preparing a poly 3,4-ethylene dioxythiophene having a matrix by chemical oxidation polymerization of 3,4-ethylene dioxythiophene in the presence of a transition metal salt of an organic sulfonic acid serving as an oxidant, the poly 3,4-ethylene dioxythiophene including the transition metal salt of the organic sulfonic acid as a dopant; and
    subsequently performing an organic sulfonate treatment on the poly 3,4-ethylene dioxythiophene using an organic sulfonate made of an anion of an acid selected from the group consisting of phenol sulfonic acid, cresol sulfonic acid and benzaldehyde sulfonic acid, and a metal cation other than a transition metal.

As written above, claim 1, line 4, the term "the" preceding "transition metal salt" has been changed to "a" to address a lack of antecedent issue. In claim 1, line 5, the term "the" preceding "organic sulfonic acid" has been changed to "an" to address a lack of antecedent issue. In claim 1, lines 8-12, the term "subjecting" of line 8 is clarified by replacing the paragraph with "subsequently performing an organic sulfonate treatment on the poly 3,4-ethylene dioxythiophene using an organic sulfonate made of an anion of an acid selected from the group consisting of phenol sulfonic acid, cresol sulfonic acid and benzaldehyde sulfonic acid, and a metal cation other than a transition metal".

2. A method for preparing a conductive polymer according to claim 1, wherein the organic sulfonate is added on the matrix by coating.

3. A method for preparing a conductive polymer according to claim 1, wherein the organic sulfonate is added in the matrix by immersion.

4. A method for preparing a conductive polymer according to claim 1, wherein the organic sulfonate, used in the organic sulfonate treatment, is made of an anion of phenol sulfonic acid, and a cation selected from the group consisting of magnesium, calcium and aluminum.

5. A method for preparing a conductive polymer according to claim 1, wherein the organic sulfonate, used in the organic sulfonate treatment, is selected from the group consisting of magnesium phenolsulfonate, calcium phenolsulfonate, aluminium phenolsulfonate, calcium cresolsulfonate and sodium benzaldehydesulfonate.

* * * * *